(12) United States Patent
Morris et al.

(10) Patent No.: US 11,596,894 B2
(45) Date of Patent: Mar. 7, 2023

(54) PROCESS FOR PURIFYING HYDROGEN GAS FOR USE IN FUEL CELLS

(71) Applicant: NuMat Technologies Inc., Skokie, IL (US)

(72) Inventors: William Morris, Chicago, IL (US); William Joseph Hoover, Chicago, IL (US); Ross James Verploegh, Buffalo Grove, IL (US); Edwin Alfonso Argueta Fajardo, Chicago, IL (US); Alexander Matthew Ruddick, Chicago, IL (US)

(73) Assignee: NuMat Technologies Inc., Skokie, IL (US)

( * ) Notice: Subject to any disclaimer, the term of this patent is extended or adjusted under 35 U.S.C. 154(b) by 40 days.

(21) Appl. No.: 17/325,960

(22) Filed: May 20, 2021

(65) Prior Publication Data

US 2021/0362088 A1 Nov. 25, 2021

Related U.S. Application Data

(60) Provisional application No. 63/029,200, filed on May 22, 2020.

(51) Int. Cl.
| | |
|---|---|
| *B01D 63/00* | (2006.01) |
| *B01D 53/04* | (2006.01) |
| *H01M 8/0606* | (2016.01) |
| *B01J 20/22* | (2006.01) |
| *B01J 20/28* | (2006.01) |

(52) U.S. Cl.
CPC ........ *B01D 53/0415* (2013.01); *B01J 20/226* (2013.01); *B01J 20/2808* (2013.01); *B01J 20/28061* (2013.01); *H01M 8/0606* (2013.01); *B01D 2253/204* (2013.01); *B01D 2253/308* (2013.01); *B01D 2253/342* (2013.01); *B01D 2256/16* (2013.01); *B01D 2257/304* (2013.01);
(Continued)

(58) Field of Classification Search
CPC ........ B01D 2253/204; B01D 2253/308; B01D 2256/16; B01D 53/02; B01D 53/0415
See application file for complete search history.

(56) References Cited

U.S. PATENT DOCUMENTS

| | | | |
|---|---|---|---|
| 5,912,422 A | 6/1999 | Bomard | |
| 8,192,527 B2 * | 6/2012 | Pirngruber | ................ C01B 3/56 95/55 |

(Continued)

FOREIGN PATENT DOCUMENTS

WO 2007111738 A2 10/2007

OTHER PUBLICATIONS

"PCT Search Report and Written Opinion for PCT/US2021/033419", dated Sep. 2, 2021.

*Primary Examiner* — Sharon Pregler
(74) *Attorney, Agent, or Firm* — Paschall & Associates, LLC; James C. Paschall

(57) ABSTRACT

The invention generally relates to a process for purifying a hydrogen gas for use in a fuel cell. The process involves taking a hydrogen feed stream from a high-pressure tank and passing it through a purifier comprising an adsorbent to provide a purified hydrogen stream which is sent to a fuel cell. A particular adsorbent which can be used is a metal-organic framework composition. The adsorbent can be housed in a device such as a canister or cartridge having an inlet and outlet port.

24 Claims, 2 Drawing Sheets

(52) U.S. Cl.
CPC ...... *B01D 2257/40* (2013.01); *B01D 2257/50* (2013.01); *B01D 2257/702* (2013.01)

(56) References Cited

U.S. PATENT DOCUMENTS

| | | | |
|---|---|---|---|
| 2004/0045434 A1* | 3/2004 | Golden | B01J 20/0229 |
| | | | 95/143 |
| 2005/0109205 A1 | 5/2005 | White | |
| 2010/0089233 A1 | 4/2010 | Pirngruber | |
| 2010/0136439 A1 | 6/2010 | Ukai | |
| 2021/0252475 A1* | 8/2021 | Ji | B01J 20/2808 |

* cited by examiner

PROCESS FOR PURIFYING HYDROGEN GAS FOR USE IN FUEL CELLS

STATEMENT REGARDING FEDERALLY SPONSORED RESEARCH OR DEVELOPMENT

This invention was made with U.S. Government support under Agreement No. DE-SC0019959 awarded by the Department of Energy. The Government has certain rights in the invention.

FIELD

This invention generally relates to a process for purifying hydrogen for use in a fuel cell. The process uses a purifier containing an adsorbent which is placed between a hydrogen storage device and the fuel cell.

BACKGROUND

There has been recent interest in powering vehicles with electricity that is created on board by electrochemical reaction of hydrogen and oxygen within a polymer electrolyte membrane to produce water as a by-product. In a polymer electrolyte membrane fuel cell (PEM), also called a proton exchange membrane, hydrogen is passed on the anode side of the membrane while air, containing the oxygen, is passed on the cathode side of the membrane. At the anode, a platinum catalyst causes the hydrogen to ionize into hydrogen ions or more particularly, protons and electrons. The PEM allows only the protons to pass through it to the cathode side where the hydrogen combines with the oxygen to produce the water. The electrons pass from the anode to the cathode through an external circuit that can be connected to an electrical motor to propel the vehicle.

The hydrogen purity requirement for the PEM fuel cell is quite stringent because any carbon monoxide, as well as other impurities in the hydrogen, will tend to poison the platinum catalyst used in the fuel cell. The hydrogen which is to be used in vehicles is primarily produced in a large-scale steam methane reforming system that produces a synthesis gas that is purified to produce the hydrogen. The hydrogen is then distributed to fueling stations where it is supplied to an on-board high-pressure tank contained in the vehicle either in a gaseous or liquid form. As can be appreciated, as the purity of the hydrogen increases, the cost of the hydrogen as a fuel for the vehicle also increases. Moreover, the problem of providing high purity hydrogen is exacerbated in that in transporting and charging the vehicle fuel tank with the hydrogen, impurities can be introduced into the hydrogen. Currently, hydrogen is purified at the point of production and hydrogen impurities introduced through the supply chain can be introduced into the vehicle fuel cell.

Applicants have addressed this problem by introducing a secondary point of purification closer to the point of use thus removing damaging impurities. As will be detailed below, Applicants have developed a process by which hydrogen from a tank is purified sufficiently so that it can be fed to a fuel cell without harm to the catalyst.

SUMMARY

One embodiment of the invention is a process comprising: flowing a hydrogen stream comprising at least one contaminant from a high-pressure tank through a purifier comprising an adsorbent at purification conditions thereby substantially removing at least one contaminant to provide a purified hydrogen stream and flowing the purified hydrogen stream to a fuel cell.

In yet another embodiment the purified hydrogen stream meets the specification of Society of Automotive Engineers (SAE) hydrogen specification no. J2719_201109.

In another embodiment the adsorbent is selected from metal organic frameworks (MOFs), zeolites, activated carbon, covalent organic frameworks (COFs), porous organic polymers (POPs) and mixtures thereof.

A further embodiment is the process described above where the adsorbent comprises a MOF and the MOF comprises metal ion corner atoms where the metal ion is selected from $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^3$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^3$, $Co^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and mixtures thereof, the metal ion corner atoms being joined by at least bidentate organic linker molecules to form a metal organic framework structure. Optionally, bidentate inorganic linker molecules also can be used. The organic linker molecules can be selected from one or more ligands comprising a saturated or unsaturated alkyl or aryl backbone, optionally comprising one or more heteroatoms S, N, O, or P, and optionally comprising one or more functional groups bound to the backbone, each ligand comprising two or more sites capable of binding to a metal ion corner atom, thereby forming a metal organic framework.

In yet another embodiment the MOF comprises metal ion corner atoms where the metal ion is selected from $Ti^{4+}$, $Zr^{4+}$, $Hf^{4+}$, $Fe^{3+}$, $Fe^{2+}$, $Co^{3+}$, $Co^{2+}$, $Ni^{2+}$, $Ni^+$, $Cu^{2+}$, $Cu^+$, $Zn^{2+}$, $Ga^{3+}$, $Al^{3+}$ and mixtures thereof.

In one embodiment the organic linker molecule is selected from substituted or unsubstituted mono- or polynuclear aromatic di-, tri-, and tetra-carboxylic acids and unsubstituted or substituted, with at least one hetero atom, aromatic, di-, tri-, and tetracarboxylic acids and mixtures thereof. In one embodiment inorganic halides such as $SiF_6$ also may be used as linkers in the framework structure.

In one embodiment the linker is selected from 1,3,5-benzene tricarboxylic acid (BTC), triazine tris-benzoic acid (TATB), 2-amino-terephthalic acid, naphthalene dicarboxylate (NDC), acetylene dicarboxylate (ADC), benzene-1,4-dicarboxylic acid (BDC), benzene tribenzoate (BTB), methane tetrabenzoate (MTB), adamantane tetracarboxylate (ATC), adamantane tribenzoate (ATB), 4,4',4'',4'''-(pyrene-1,3,6,8-tetrayl)tetrabenzoic acid (TBAPy), meso-Tetraphenylporphine-4,4',4'',4'''-tetracarboxylic acid (TCPPH2), 3,3',5,5'-azobenzenetetracarboxylic acid, 2,5-dihydroxyterephthalic acid, pyrazine, 1,4-diazabicyclo[2.2.2]octane, $SiF_6$, and mixtures thereof.

In yet a further embodiment, the MOF is selected from MOF-74-Co, MOF-74-Ni, MOF-74-Cu, PCN-250, HKUST-1, UiO-66, UiO-66-$NH_2$, SIFSIX-3, MIL-88, MIL-89, Ga-soc-MOF, $Zn_2(BDC)_2(DABCO)$, and mixtures thereof.

Yet another embodiment is where the adsorbent has a B.E.T. surface area from about 200 $m^2/g$ to 10000 $m^2/g$.

Another embodiment is where the MOF has a pore size from about 2 Angstroms to about 500 Angstroms, or in another embodiment the MOF has a pore size from about 3 Angstroms to about 500 Angstroms.

A further embodiment is where the contaminant to be removed is selected from $H_2S$, CO, formaldehyde, $CO_2$, COS, $CS_2$, methyl mercaptan, $NH_3$, hydrocarbons, halogenates, water, and mixtures thereof.

In yet another embodiment the adsorbent such as a MOF is in the form of abed through which the hydrogen stream flows.

Another embodiment is where the purifier comprises a cartridge which contains an adsorbent such as a MOF. The cartridge can be a disposable cartridge.

In yet a further embodiment the adsorbent such as a MOF is formed into a shape selected from pellets, spheres, extrudates, irregularly shaped particles, monolithic shapes, and mixtures thereof.

An embodiment is where the adsorbent such as a MOF is deposited onto a solid support selected from a membrane, woven fiber, non-woven fiber, a monolithic support, a ceramic support, a metal support, and mixtures thereof.

A further embodiment comprises operating the purifier at a temperature from about −40° C. to about 40° C. and a pressure from about 100 kPa to about 84 MPa and the hydrogen stream is flowed through the purifier at a flow rate from about 0.05 kg/hr. to about 2 kg/hr.

In yet a further embodiment the process is carried out onboard a hydrogen-powered motorized vehicle.

In still another embodiment the adsorbent such as a MOF is regenerated by changing the temperature or changing the pressure.

Yet another embodiment is where the high-pressure tank, purifier and fuel cell are part of a stationary power system.

A further embodiment is where the stationary power system is housed in a container and the power system provides power to a building such as an individual home or a commercial building or a residential building.

DETAILED DESCRIPTION

Figure 1:
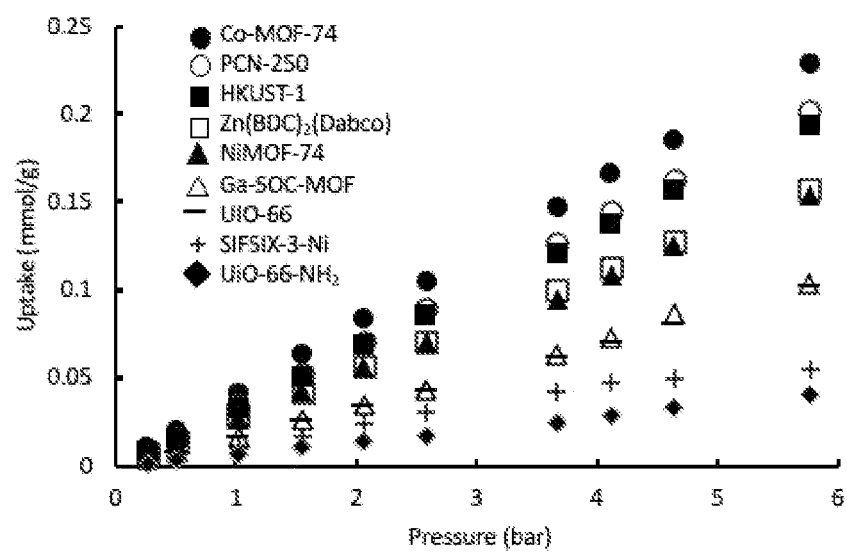
FIG. 1 is a plot of single-component hydrogen adsorption by several MOF adsorbents as a function of pressure at room temperature.

As stated, there is interest in the use of fuel cells in powering vehicles. An essential part of such fuel cells is the use of ultra-pure hydrogen in order not to deactivate or destroy the catalyst (usually platinum) used in the fuel cell. The common way to provide hydrogen to a fuel cell onboard a vehicle is to use a high-pressure tank. Although this hydrogen is pure, it may not be sufficiently pure to be fed to the fuel cell. Applicant has developed a process whereby hydrogen from a high-pressure tank can be sufficiently purified so that it can be fed to the fuel cell without damaging the fuel cell catalyst. The process generally comprises passing a hydrogen stream comprising hydrogen and at least one contaminant from the high-pressure tank through a purifier which comprises an adsorbent, at purification conditions thereby substantially removing at least one contaminant to provide a purified hydrogen stream which is then flowed to the fuel cell.

One element of the invention is an adsorbent through which flows the hydrogen stream, i.e. feed stream to be purified. The adsorbent which can be used comprises any number of adsorbents which are characterized by a B. E. T. surface area of at least 200 $m^2/g$ or at least 400 $m^2/g$ or at least 600 $m^2/g$, or at least 1000 $m^2/g$ or at least 5000 $m^2/g$, or at least 8000 $m^2/g$ or at least 10,000 $m^2/g$. In a particular aspect, the surface area is from about 200 $m^2/g$ to about 10,000 $m^2/g$. General categories of adsorbents which have this property and can be used in the invention include without limitation metal organic framework materials (MOFs), zeolites, activated carbon, covalent organic frameworks (COFs), porous organic polymers (POPs) and mixtures thereof.

MOFs are well known porous adsorbents with high surface areas. MOF adsorbents comprise metal ion corner atoms and an at least bidentate linker molecule or a ligand, which is connected to the corner atom(s) thereby forming a framework structure. The metal ions which can be used include but are not limited to $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^{3+}$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and mixtures thereof. A subgroup of the metal ions is selected from $Ti^{4+}$, $Zr^{4+}$, $Hf^+$, $Fe^{3+}$, $Fe^{2+}$, $Co^{3+}$, $Co^{2+}$, $Ni^{2+}$, $Ni^+$, $Cu^{2+}$, $Cu^+$, $Zn^{2+}$, $Ga^{3+}$, $Al^{3+}$ and mixtures thereof. From this subgroup a further subgroup of metal ions includes those selected from $Ti^{4+}$, $Zr^{4+}$, $Fe^{3+}$, $Co^{3+}$, $Ni^{2+}$, $Cu^{2+}$, $Zn^{2+}$, $Ga^+$, $Al^{3+}$ and mixtures thereof.

The metal ion corner atoms are joined by at least bidentate organic linker molecules comprising two or more sites capable of binding to a metal ion corner atom to form a metal organic framework structure. Optionally, at least bidentate inorganic linker molecules also can be used. The at least bidentate organic linker molecules include but are not limited to those having a saturated or unsaturated alkyl or aryl backbone, optionally comprising one or more heteroatoms S, N, O, or P, and optionally comprising one or more functional groups bonded to the backbone. In certain embodiments the linker backbone can comprise one or more groups selected from 1) saturated or unsaturated, linear, branched or cyclic alkyl groups having from 1 to 10 carbon atoms and optionally comprising heteroatoms; and 2) groups comprising 1 to 5 aryl or heteroaryl rings which can be fused or joined covalently; wherein the hetero atoms are selected from S, N, O, P and mixtures thereof. The backbones of the linker molecules may have bonded thereto one or more functional groups, including but not limited to saturated and unsaturated alkyl, aryl, heteroaryl, halide, —OH, —NH$_2$, —COOH, NO$_2$, COH, CO(NH$_2$), CN and thiols. In one embodiment the functional groups are selected from COOH and NH$_2$.

Silicon halides such as $SiF_6$ also may be used as linkers in the framework structure.

A subgroup of these ligands includes substituted or unsubstituted, mono- or polynuclear aromatic di-, tri- and tetracarboxylic acids and unsubstituted or substituted, with at least one hetero atom, aromatic di-, tri- and tetracarboxylic acids. A specific embodiment of these ligands includes without limitation 1,3,5-benzene tricarboxylic acid (BTC), triazine tris-benzoic acid (TATB), 2-amino-terephthalic acid, naphthalene dicarboxylate (NDC), acetylene dicarboxylate (ADC), benzene-1,4-dicarboxylic acid (BDC), benzene tribenzoate (BTB), methane tetrabenzoate (MTB), adamantane tetracarboxylate (ATC), adamantane tribenzoate (ATB), 4,4',4'',4'''-(pyrene-1,3,6,8-tetrayl)tetrabenzoic acid (TBAPy), meso-Tetraphenylporphine-4,4',4'',4'''-tetracarboxylic acid (TCPPH2), 3,3',5,5'-azobenzenetetracarboxylic acid, 2,5-dihydroxyterephthalic acid, pyrazine, 1,4-diazabicyclo[2.2.2]octane, $SiF_6$, and mixtures thereof.

Specific MOFs include without limitation MOF-74-Co, MOF-74-Ni, MOF-74-Cu, PCN-250, HKUST-1, UiO-66, UiO-66-NH$_2$, SIFSIX-3-Ni, MIL-88, MIL-89, Ga-soc-MOF, $Zn_2(BDC)_2(DABCO)$ and mixtures thereof.

There are several ways to prepare MOF compositions but the most commonly used one is the solvothermal synthesis. For example, see Yujia Sun and Hong-Cai Zhou, *Recent Progress in the Synthesis of Metal Organic Frameworks, Sci. Technol. Adv. Mater.* 16 (2015), 054202 which is incorporated by reference. In this procedure a metal salt and the desired ligand/linker are dissolved in an appropriate solvent and reacted at an elevated temperature for a required time. Once the MOF is formed, the powder is isolated from the reaction mixture, washed and dried.

Another adsorbent which can be used in the process of the invention is a zeolite. Zeolites are crystalline aluminosilicate compositions that are microporous and that are formed from corner sharing $AlO_2$ and $SiO_2$ tetrahedra. Numerous zeolites, both naturally occurring and synthetically prepared, can be used in the practice of the invention. Synthetic zeolites are prepared via hydrothermal synthesis employing suitable sources of Si, Al, and structure directing agents such as alkali metals, alkaline earth metals, amines, and/or organo-ammonium cations. The structure-directing agents reside in the pores of the zeolite and are largely responsible for the particular structure that is ultimately formed. These species balance the framework charge associated with aluminum and can also serve as space fillers. The naturally occurring zeolites include but are not limited to faujasite, analcime, chabazite, clinoptilolite, heulandite, natrolite, phillipsite, stilbite, mordenite, erionite, offretite, ferrierite and mixtures thereof. Of these, faujasite, chabazite, clinoptilolite, phillipsite, mordenite, erionite, offretite, ferrierite and mixtures thereof are of particular interest. Synthetic zeolites include without limitation zeolites A, B, X, Y, L, alpha, beta, omega, ZSM-5, silicalite, ZSM-11, MCM-22, ZK-4, EU-1, FU-1, NU-1, LZ-210 and mixtures thereof. Part or all of the silica in a zeolite can be substituted. For example, SAPO, ALPO, MeAPO, where Me is a metal selected from Li, Be, B, Mg, Mn, Si, Ti, Fe, Zn, Ga, Ge, As, and Cr. A review of the history of zeolites along with their structures and characteristics can be found in *Studies in Surface Science and Catalysis, vol.* 137, H. van Bekkum, E. M. Flanigen, P. A. Jacobs and J. C. Jansen (editors), 2001, Elsevier Science B. V. which is incorporated by reference.

Activated carbon is a highly porous, high surface area adsorptive material with a largely amorphous structure. It is composed primarily of aromatic configurations of carbon atoms joined by random cross-linkages. The degree of order varies based on the starting raw material and thermal history. Graphitic platelets in steam-activated coal are somewhat ordered, while more amorphous aromatic structures are found in chemically activated wood. Randomized bonding creates a highly porous structure with numerous cracks, crevices and voids between the carbon layers. Activated carbon sorbents are tailored for specific applications mainly based on pore size and pore volume requirements. Porosity and other parameters are controlled by the following: 1) raw material selection; 2) activation process conditions; and 3) post-processing steps. Depending on the application, activated carbon may be in the form of powder (PAC), granule (GAC) or extrudate (EAC). All three forms are available in a range of particle sizes. A review of the fundamentals of activated carbon can be found in an article entitled: *Activated Carbon: Fundamentals and New Applications*, Ken Koehlert, Chemical Engineering, July 2017, pp. 32-40, which is incorporated by reference.

Porous organic polymers (POP) are the polymerization product from at least a plurality of organic monomers. POPs are generally constructed from monomer units that are multitopic (three or more connection points). While the degree of cross-linking in a microporous polymeric material depends on the concentration of cross-linking molecules added, cross-linking in POPs is dictated by the valency/topicity of the monomer or co-monomer unit(s). Cross-links in POPs, formed between rigid building blocks, are also different from those in polymer gels, which are usually formed between flexible chains and side chains. POPs are amorphous materials and their synthesis is well known in the art. For example, POPs can be synthesized from the reaction of: 1) catechol and aryl halides; 2) anhydride monomer and diamine monomer; and 3) carboxylic monomer and diamine monomer.

Covalent organic frameworks (COF) are a subset of POPs in that they are crystalline materials. Again, these materials and their synthesis are well known in the art.

Regardless of which type of adsorbent is chosen, it is necessary that the adsorbent have pores from about 2 to about 500 angstroms, or from about 3 to about 500 angstroms, or from about 3 to about 200 angstroms, or from about 3 to about 100 angstroms, or from about 5 to about 200 angstroms, or from about 10 to about 200 angstroms, or from about 5 to about 100 angstroms or from about 10 to about 100 angstroms. By having pores which are larger than 2 angstroms, or larger than 3 angstroms, the adsorbent is able to adsorb contaminants or impurities without substantially adsorbing hydrogen.

Although the various adsorbents can be used in the powder form, it may be advantageous to form the adsorbent into various shaped bodies such as pellets, spheres, disks, monolithic bodies, irregularly shaped particles and extrudates. The methods of forming these types of shapes are well known in the art. The adsorbent materials can be formed into various shapes by themselves or by including a binder. When selecting a binder, it is important to select a binder such that the surface area and adsorption capacity is not adversely affected once the desired shaped body is formed. Materials which can be used as binders include without limitation cellulose, silica, carbon, alumina, and mixtures thereof.

The forming process usually involves preparing a thick paste-like material by mixing the adsorbent composition with a solvent or a binder plus a solvent. Once the paste-like material is formed it can be extruded through a die having holes of about 1-2 mm to form extrudates of varying length, e.g. 6-10 mm. The paste or even the powder itself can be pressed at high pressure to form pellets or pills. Other means of forming shapes include pressure molding, metal forming, pelletizing, granulation, extrusion, rolling methods and marumerizing.

In yet another aspect of the invention, the adsorbent materials can be deposited onto articles such as, but not limited to, monoliths, spherical supports, ceramic foams, glass fibers, woven fabrics, nonwoven fabrics, membranes, pellets, extrudates, irregularly shaped particles, and mixtures thereof. When the desired article is a monolith, spherical support, ceramic foam, pellets, extrudates, or irregularly shaped particles, a slurry of the adsorbent composition is prepared and deposited on the article by means such as dipping, spray drying, etc. followed by drying and optionally calcination. For the case of MOFs, POPs, or COFs and a membrane support it is possible to form the MOF, POP or COF composition directly on the membrane. The adsorbent compositions of the invention can be deposited or dispersed onto fabrics (woven and non-woven) or polymers by techniques such as electro-spinning, direct crystal growth, and layer by layer deposition.

The adsorbent or adsorbent containing articles described in the previous paragraphs are used to purify a hydrogen feed stream by flowing the feed stream through the article, e.g. monolith, foam, membranes, fabrics whereby the adsorbent will adsorb at least a portion of the contaminants and provide a purified hydrogen stream. The adsorbent articles or the powder can also be placed in various types of rigid containers. For example, powders, extrudates, pills or spheres can be housed in a bed through which flows the hydrogen feed stream. The bed can be placed in various types of housings such as canisters (of various shapes) having an inlet and outlet port. Fabrics (both woven and non-woven) can also be formed into filters such as but not limited to pleated filters which again can be housed in rigid containers such as cartridges through which the hydrogen feed stream flows. Pleated filters can also be supported in various shape and size frame and the hydrogen feed stream flowed through it. The frames can be made of various types of materials such as but not limited to metal, wood and plastic. Fiber glass can be formed into glass wool and housed in rigid filter frames.

It is also within the scope of the invention that more than one type of adsorbent can be used to purify the hydrogen feed stream. For example, if the purifier is in the shape of a bed, two or more adsorbents can be mixed and formed into a bed. Alternatively, the adsorbents can be used as separate layers in a bed. In the case where the adsorbents are deposited onto fabrics, such as woven or non-woven fabrics, the adsorbents can be mixed and deposited as a mixture or deposited as separate layers on one fabric or deposited on separate fabrics and layered. If the adsorbents are formed into shapes such as pellets, spheres, extrudates, again two or more adsorbent powders can be combined and formed into such shapes. Alternatively, each adsorbent can be formed into a desired solid shaped article and then arranged in separate layers or the solid shaped articles mixed and then arranged in a bed or other configuration.

In one embodiment, the process yields a hydrogen stream that is at least 99% pure, in one embodiment at least 99.5% pure, in one embodiment at least 99.9% pure, in one embodiment at least 99.97% pure. In one embodiment the process yields a purified hydrogen stream characterized in that it meets at least the requirements of SAE hydrogen specification no. J2719_201109 (available from SAE at https://www.sae.org/standards/content/j2719_201511/). SAE hydrogen specification no. J2719_201109 requires a hydrogen purity of at least 99.97% with individual limitations on the various contaminants or impurities.

Regardless of how the adsorbent is formed or what type of form it is in, the purifier which can include the adsorbent plus controls, heating or cooling elements, filter housing, and sensors is operated in a manner and under conditions to purify the hydrogen feed stream. The purifier is usually operated at a temperature from about −40° C. to about 40° C., or from about −30° C. to about 40° C., or from about −20° C. to about 40° C., or from about −10° C. to about 40° C., or from about 0° C. to about 40° C. The purifier is usually operated at a pressure from about 100 kPa to about 84 MPa, or from about 100 kPa to about 60 MPa, or from about 100 kPa to about 40 MPa, or from about 100 kPa to about 30 MPa, or from about 100 kPa to about 20 MPA or from about 100 kPa to about 15 MPa, or from about 100 kPa to about 10 MPa, or from about 100 kPa to about 5 MPa, or 100 kPa to about 1500 kPa. The flow rate through the purifier must be in the range which allows for sufficient contaminants to be adsorbed while providing sufficient purified hydrogen to the fuel cell. The flow rate depends on the size of the purifier and the size of the fuel cell. That is, whether the process is carried out onboard a vehicle, e.g. a car or a stationary power source, e.g. power source for a residence or commercial building. In the case of vehicles, the flow rate is usually from about 0.05 kg/hr to about 2 kg/hr or from about 0.05 kg/hr to about 1.2 kg/hr. In the case of stationary power sources, the range is from about 0.2 kg/hr to about 10 kg/hr. or from about 0.3 kg/hr to about 7 kg/hr. Flow rates for other applications, such as sea-faring vessels, aircraft, and large vehicles such as trucks and industrial vehicles, can be determined by one skilled in the art based on the size of the fuel cell and the power demand.

Fuel cells and fuel cell technology are well known and need not be further described here.

The adsorbent once spent, i.e. reached its maximum capacity for adsorbing contaminants can be regenerated by changing the pressure, i.e. pressure swing adsorption (PSA), temperature changes, i.e. temperature swing adsorption (TSA), or by reprocessing techniques including a solvent wash. PSA and TSA can be done in situ by using two containers or beds such that while one bed is being regenerated, the other is online. Regeneration of the adsorbents will result in a decrease in the cost of the purifier system.

In one embodiment, the process of the invention can be carried out onboard a vehicle such as a car. The purifier described above can easily be placed between the outlet port of the high-pressure hydrogen tank and the inlet port to the fuel cell. The exact piping, control valves, control system, e.g. computer controls, etc. are not described here since they are well known to one of ordinary skill in the art.

The process and accordingly the hydrogen tank, purifier and fuel cell can also be used as a stationary power system which can be used to provide power to a building such as a residential structure, e.g. a house, or commercial structure, e.g. office building. In this case all components can be housed in a container which can be placed in close proximity to the where the power needs to be delivered.

EXAMPLES

Example 1: Synthesis of Ga-soc-MOF

Ga-soc-MOF was synthesized using the procedure reported in J. Am. Chem. Soc. 2012, 134, 32, 13176-13179. In a 100 mL Pyrex jar, gallium nitrate hydrate (0.6 g) and 3,3',5,5'-azobenzenetetracarboxylic acid (0.4 g) were added. The solid was then dissolved in a mixture of DMSO (40 mL) and acetonitrile (40 mL). The reaction mixture was heated at 120° C. in an oven for 24 hours, and the resulting solid precipitate was separated by centrifugation. The MOF was then washed with water and Soxhlet extracted with methanol. Finally, the MOF was dried at 150° C. under vacuum.

Example 2: Synthesis of MOF-74-Co

MOF-74-Co was synthesized using the procedure reported in *Inorg. Chem.* 2016, 55, 23, 12110-12113. In a 1 L screw cap bottle, 2,5-dihydroxyterephthalic acid (1.45 g) and cobalt nitrate (II) hexahydrate (7.13 g) were dissolved in 600 mL of 1:1:1 (v/v/v) solution of DMF, EtOH, and H2O. The suspension was sonicated until a homogenous solution was achieved and placed in an oven at 100° C. for 18 hours. The mixture was cooled down to room temperature and the supernatant solution was decanted. Then, the crystals were washed with DMF and solvent exchanged with methanol 4 times over a 48-hour period. The sample was dried at 150° C. under vacuum.

Example 3: Synthesis of HKUST-1

HKUST-1 was synthesized using the procedure reported in *Inorg. Chem.* 2016, 55, 23, 12110-12113. In a 1 L screw cap bottle 1,3,5-benzenetricarboxylic acid (21.8 g) and copper nitrate (II) trihydrate (77.22 g) were suspended in 930 mL of 15:15:1 (v/v/v) solution of EtOH, $H_2O$, and DMF. The suspension was heated at 80° C. for 16 hours. The reaction mixture was cooled to room temperature and the supernatant solution was decanted. The blue crystals were washed with MeOH and dried at 150° C. under vacuum.

Example 4: Synthesis of MOF-74-Ni

MOF-74-Ni was synthesized using the procedure reported in *J. Am. Chem. Soc.* 2008, 130, 33, 10870-10871. In a 1-L screw cap jar a solid mixture of 2,5-dihydroxyterephthalic acid (1.434 g) and $Ni(NO_3)_2 \cdot 6H_2O$ (7.134 g) was added and mixed with a 1:1:1 (v/v/v) mixture of DMF-ethanol-water (600 mL). The suspension was mixed and sonicated until homogeneous. The reaction jar was capped tightly and placed in an oven at 100° C. for 24 hours. The mixture was removed from the oven and all cooled to room temperature. The solid was filtered and washed with DMF 3 times over a 24-hour period at 60° C. Then the solid was further Soxhlet extracted with methanol for 16 hours. Finally, the MOF was activated at 150° C. under vacuum.

Example 5: Synthesis of UiO-66

UiO-66 was synthesized per a procedure adapted from *Inorg. Chem.* 2011, 50, 15, 6853-6855. A first solution of terephthalic acid (0.5 g, 3 mmol) dissolved in N,N-dimethylformamide (10 mL) was prepared. A second solution of $ZrCl_4$ (0.233 g, 1 mmol) in N,N-dimethylformamide (30 mL) was prepared. The two solutions were combined and heated at 120° C. for 24 hours to form a microcrystalline powder. The microcrystalline powder was collected by filtration washed with DMF (3×10 mL) over a thirty-minute period. The MOF was then washed with MeOH (5×30 mL) over a five-day period. Finally, the MOF was activated at 120° C. under vacuum for 48 hours.

Example 6: Synthesis of UiO-66-$NH_2$

UiO-66-$NH_2$ was synthesized per *Inorg. Chem.* 2011, 50, 15, 6853-6855. 2-Aminoterephthalic acid (0.543 g, 3 mmol) was added to N,N-dimethylformamide (10 mL) and fully dissolved. $ZrCl_4$ (0.233 g, 1 mmol) was fully dissolved in N,N-dimethylformamide (30 mL). The two solutions were combined and heated at 120° C. for 24 hours to form a microcrystalline powder. The microcrystalline powder was collected by filtration and washed with DMF (3×10 mL) over a thirty-minute period. The MOF was washed with MeOH. Finally, the MOF was activated at 120° C. under vacuum for 48 hrs.

Example 7. Synthesis of PCN-250

PCN-250 was synthesized using the procedure reported in *Nat. Commun.* 5, 5723 (2014). In a Pyrex vial, 3,3',5,5'-azobenzenetetracarboxylic acid (10 mg), $Fe_3O(CH_3COO)_6$ (15 mg), and acetic acid (1 ml) in 2 ml of DMF were ultrasonically dissolved. The mixture was heated in an oven at 140° C. for 12 hours. After cooling down to room temperature, dark brown crystals were collected by filtration, then washed with DMF, then MeOH. Finally, the MOF was activated at 150° C. under vacuum for 48 hrs.

Example 8: Synthesis of SIFSIX-3-Ni

SIFSIX-3-Ni was synthesized using the procedure reported in *Chem. Commun.*, 2015, 51, 15530-15533. In a Teflon lined steel bomb reactor, $NiSiF_6$ (0.20 g) was mixed with pyrazine (0.16 g) then dissolved in 20 ml methanol and heated to 85° C. for 3 days. The resulting blue powder was collected and washed with DMF then methanol. Finally, the MOF was activated at 150° C. under vacuum for 48 hours.

Example 9: Synthesis of $Zn_2(BDC)_2(DABCO)$ $Zn_2(BDC)_2(DABCO)$ was synthesized using the procedure reported in Angew. Chem. Int. Ed. 2004, 43, 5033-5036. In a Teflon-lined steel bomb reactor, a mixture of $Zn(NO_3)_2 \cdot 6H_2O$ (1.0 g), $H_2$-benzenedicarboxylic acid (0.560 g), and 1,4-diazabicyclo[2.2.2]octane (DABCO) (0.187 g) were suspended in DMF (40 mL) and heated at 120° C. for 2 days. The colorless crystalline precipitate which formed was collected, washed with DMF, and activated at 150° C. under vacuum for 48 hrs.

Example 10: Breakthrough Experiment

Several of the MOFs described above were tested to determine their capacity for several impurities and the amount of time needed for the impurity to break through. A sample of MOF (200 mg) was placed into a column through which a mixture of the impurity and helium was flowed at 50 sccm at a pressure of 100 kPa. The amount of impurity exiting the column was measured as a function of time. The initial concentration of the gases tested was: 250 ppm $NH_3$ in a He carrier gas; 262 ppm CO in a He carrier gas; and 150 ppm $H_2S$ in a He carrier gas. The gases and the columns were all at room temperature. The results of these experiments are presented in Table 1 below.

TABLE 1

Breakthrough time and adsorption capacity of MOFs for various impurities

| Sample | $NH_3$ breakthrough time (mins) | $NH_3$ Uptake (mmol/g) | $H_2S$ breakthrough time (mins) | $H_2S$ Uptake (mmol/g) | CO Breakthrough time (mins) | CO uptake (mmol/g) |
|---|---|---|---|---|---|---|
| $Zn(BDC)_2DABCO$ | 15.5 | 0.03 | 2.5 | 0.001 | 1.7 | 0.003 |
| UiO-66-$NH_2$ | 218.5 | 0.51 | 1.2 | 0 | 1.7 | 0 |
| PCN-250 | 194 | 0.50 | 272 | 0.12 | 2.5 | 0.002 |
| HKUST-1 | 660 | 1.13 | 2012 | 1.03 | 1.9 | 0.009 |

TABLE 1-continued

Breakthrough time and adsorption capacity of MOFs for various impurities

| Sample | $NH_3$ breakthrough time (mins) | $NH_3$ Uptake (mmol/g) | $H_2S$ breakthrough time (mins) | $H_2S$ Uptake (mmol/g) | CO Breakthrough time (mins) | CO uptake (mmol/g) |
|---|---|---|---|---|---|---|
| Co-MOF-74 | 406 | 1.16 | 517 | 0.20 | 30 | 0.09 |
| Ni-MOF-74 | 213 | 0.91 | 939 | 0.41 | 38 | 0.1 |

These results show that adsorbents such as MOFs are able to remove impurities even when the impurities are at a very low concentration, i.e. ppm levels.

Example 11: Adsorption of Hydrogen on MOFs

The MOFs synthesized above were tested to determine the amount of hydrogen they adsorbed at room temperature. Adsorption isotherms were run at room temperature at various pressures. The results of the experiments are presented in FIG. 1 which shows the uptake of hydrogen (mmol $H_2$/g of MOF) as a function of pressure (bar). The results indicate very low adsorption of hydrogen up to 6 bar (600 kPa). This indicates that MOFs are well suited to purify hydrogen because while they adsorb impurities very well, they adsorb very little hydrogen.

Figure 2:
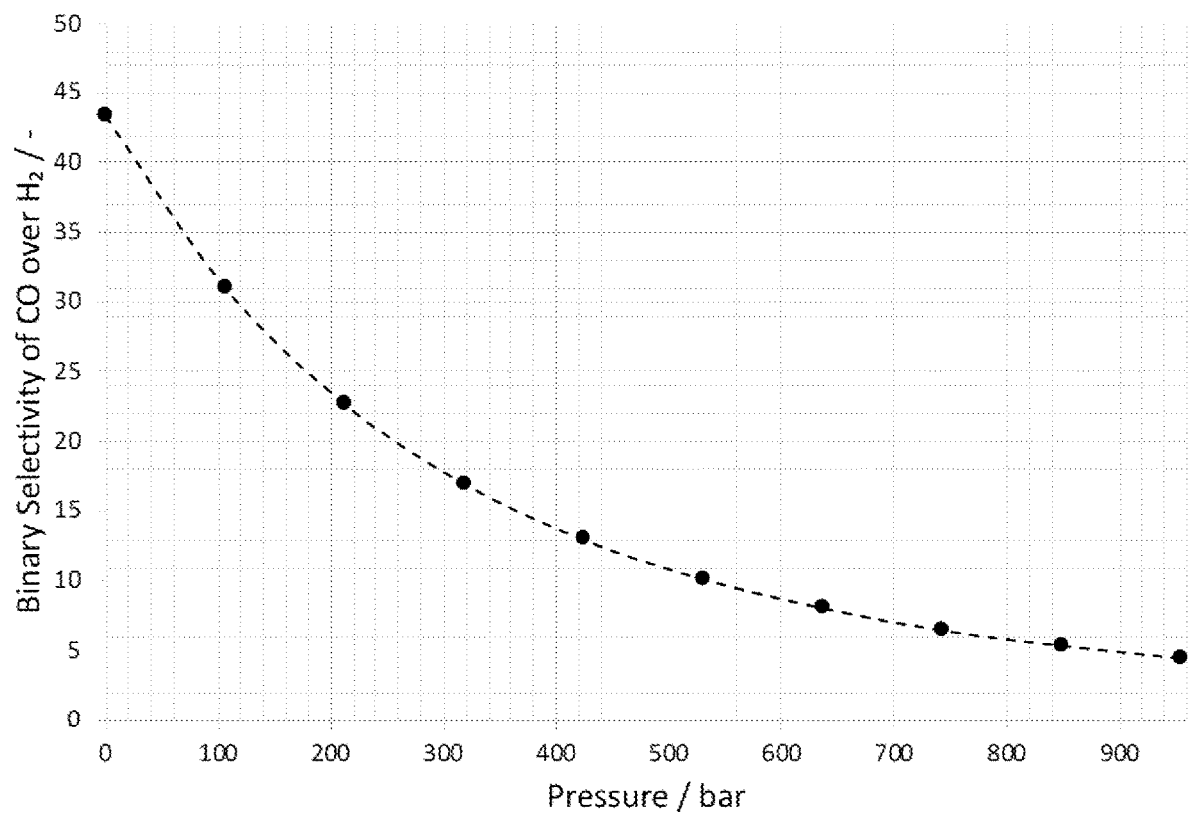
FIG. 2 is a plot of the $CO/H_2$ selectivity for Fe-PCN-250 MOF versus pressure at 25° C.

Example 12: Adsorption Selectivity (Impurity/Hydrogen) as a Function of Pressure Fe-PCN-250 was used to model the effect of pressure on the relative selectivity of a MOF for hydrogen versus a CO impurity. Initially the CO isotherm for Fe-PCN-250 was measured at room temperature from 1 kPa to 936 kPa (0.01 bar to 9.36 bar). Next a $H_2$ isotherm for Fe-PCN-250 was simulated using Grand Canonical Monte Carlo (GCMC) methods at 25° C. from $1 \times 10^{-5}$ to 950 bar. The experimental CO isotherm and simulated $H_2$ isotherm were both fit with the empirical Langmuir isotherm model. Ideal Adsorbed Solution Theory (IAST) was applied, using the fitted single-component isotherms, to calculate the CO/$H_2$ binary component isotherms at fixed gas phase mole fractions of 0.999999 $H_2$ and $1 \times 10^{-6}$ CO. The binary selectivity, derived from the IAST-calculated binary isotherms, is defined as:

$$S_{CO,H2} = \frac{x_{CO}/y_{CO}}{x_{H2}/y_{H2}}$$

where $x_i$ is the mole fraction of gas i in the adsorbed phase and $y_i$ is the mole fraction of gas i in the gas phase. These results are shown in FIG. 2 which is a plot of pressure (bar) versus the mole fraction ratio of CO/$H_2$ in the adsorbed phase over the mole fraction ratio CO/$H_2$ in the gas phase. At higher pressures, there is significant uptake of $H_2$ in Fe-PCN-250. This means that the $H_2$ is competing with CO for adsorption sites on the MOF, reducing the purification efficiency of the MOF and reduction in hydrogen purity.

Example 13: Regeneration of MOFs

UiO-66, and UiO-66-$NH_2$ were tested to determine the extent to which they could be regenerated. Ammonia was flowed through the MOFs and then each MOF was regenerated by treating the MOF under vacuum either at room temperature or at 100° C. After this treatment, the MOFs were again exposed to an ammonia containing stream. The results showed that UiO-66 was fully regenerated while UiO-66-$NH_2$ was only partially regenerated. It is believed that these UiO-66-$NH_2$ MOFs can be fully regenerated by further adjusting the regeneration conditions.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

The invention claimed is:

1. A process for providing purified hydrogen to a hydrogen fuel cell, the process comprising:
   providing a system comprising a high-pressure tank containing hydrogen gas having at least one contaminant, a purifier containing an adsorbent, and a fuel cell;
   flowing a hydrogen stream from said high-pressure tank through said purifier at purification conditions thereby substantially removing said at least one contaminant to provide a purified hydrogen stream, and
   flowing said purified hydrogen stream to said fuel cell.

2. The process of claim 1 where the at least one contaminant is selected from $H_2S$, CO, formaldehyde, $CO_2$, COS, $CS_2$, methyl mercaptan, $NH_3$, hydrocarbons, halogenates, and water.

3. The process of claim 1 where the purified hydrogen stream has a purity of at least 99.7%.

4. The process of claim 1 where the purifier is operated at a temperature from about −40° C. to about 40° C. and a pressure from about 100 kPa to about 84 MPa.

5. The process of claim 1 further characterized in that the purifier comprises a cartridge which contains the adsorbent.

6. The process of claim 5 where the cartridge is a disposable cartridge.

7. The process of claim 1 where the adsorbent is selected from metal organic frameworks (MOFs), zeolites, activated carbon, covalent organic frameworks (COFs), porous organic polymers (POPs) and mixtures thereof.

8. The process of claim 1 where the purifier comprises at least two different adsorbents.

9. The process of claim 7 where the adsorbent comprises a MOF and the MOF comprises metal ion corner atoms where the metal ion is selected from $Li^+$, $Na^+$, $K^+$, $Rb^+$, $Be^{2+}$, $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{5+}$, $V^{4+}$, $V^{3+}$, $Nb^{3+}$, $Ta^{3+}$, $Cr^{3+}$, $Cr^{2+}$, $Mo^3$, $W^{3+}$, $Mn^{3+}$, $Fe^{3+}$, $Fe^{2+}$, $Ru^{3+}$, $Ru^{2+}$, $Os^{3+}$, $Os^{2+}$, $Co^3$, $Co^{2+}$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Al^{3+}$, $Ga^{3+}$, $In^{3+}$, $Si^{4+}$, $Si^{2+}$, $Ge^{4+}$, $Ge^{2+}$, $Sn^{4+}$, $Sn^{2+}$, $Bi^{5+}$, $Bi^{3+}$, $Cd^{2+}$, $Mn^{2+}$, $Tb^{3+}$, $Gd^{3+}$, $Ce^{3+}$, $La^{3+}$ and $Cr^{4+}$, and mixtures thereof, the metal ions being joined by an at least bidentate organic linker molecules to form a metal organic framework, the at least bidentate organic linker molecules being selected from one or more molecules comprising a linker backbone comprising one or more groups selected from 1) saturated or unsaturated, linear, branched or cyclic alkyl groups having from 1 to 10 carbon atoms and optionally comprising heteroatoms; and 2) groups comprising 1 to 5 aryl or heteroaryl rings which can be fused or joined covalently; wherein the hetero atoms are selected from S, N, O, P and mixtures thereof; and optionally comprising one or more functional groups selected from one or more of saturated and unsaturated alkyl, aryl, heteroaryl, halide, —OH, —NH$_2$, —COOH, NO$_2$, COH, CO(NH$_2$), CN and thiols.

10. The process of claim 9 where the metal ion is selected from Ti$^{4+}$, Zr$^{4+}$, Hf$^{4+}$, Fe$^{3+}$, Fe$^{2+}$, Co$^{3+}$, Co$^{2+}$, Ni$^{2+}$, Ni$^+$, Cu$^{2+}$, Cu$^+$, Zn$^{2+}$, Ga$^{3+}$, Al$^{3+}$ and mixtures thereof and the linker molecule is selected from 1,3,5-benzene tricarboxylic acid (BTC), triazine tris-benzoic acid (TATB), 2-aminoterephthalic acid, naphthalene dicarboxylate (NDC), acetylene dicarboxylate (ATC), benzene-1,4- dicarboxylic acid (BDC), benzene tribenzoate (BTB), methane tetrabenzoate (MTB), adamantane tetracarboxylate (ATC), adamantane tribenzoate (ATB), 4,4',4'',4'''-(pyrene-1,3,6,8-tetrayl)tetrabenzoic acid (TBAPy), meso-Tetraphenylporphine-4,4',4'', 4'''-tetracarboxylic acid (TCPPH2), 3,3',5,5'-azobenzenetetracarboxylic acid, 2,5-dihydroxyterephthalic acid, pyrazine, 1,4-diazabicyclo[2.2.2]octane, and mixtures thereof.

11. The process of claim 1 where the adsorbent has a B. E. T. surface area of at least 200 m$^2$/g.

12. The process of claim 9 where the MOF has an average pore size from about 2 angstroms to about 500 angstroms.

13. The process of claim 1 where the adsorbent is in the form of a bed through which the hydrogen stream flows.

14. The process of claim 1 further characterized in that the adsorbent is deposited onto a solid support selected from a membrane, woven fiber, non-woven fiber, a monolithic support, a ceramic foam, a metal support, and mixtures thereof.

15. The process of claim 1 further characterized in that the adsorbent is formed into a shape selected from pellets, spheres, extrudates, irregularly shaped particles, monolithic shapes, and mixtures thereof.

16. The process of claim 9 where the MOF is selected from MOF-74-Co, MOF-74-Ni, MOF-74-Cu, PCN-250, HKUST-1, UiO-66, UiO-66-NH$_2$, SIFSIX-3, MIL-88, MIL-89, Ga-soc-MOF, Zn$_2$(BDC)$_2$(DABCO), and mixtures thereof.

17. The process of claim 1 further characterized in that the process is carried out onboard a vehicle.

18. The process of claim 17 where the hydrogen stream is flowed through the purifier at a flow rate from about 0.05 kg/hr. to about 2 kg/hr.

19. The process of claim 4 where the pressure is from about 100 kPa to about 40 MPa.

20. The process of claim 1 further characterized in that the adsorbent is regenerated by changing the temperature or changing the pressure.

21. The process of claim 1 further characterized in that the high-pressure tank, purifier and fuel cell are part of a stationary power system.

22. The process of claim 21 where the stationary power system is housed in a container and the power system provides power to a building.

23. The process of claim 21 where the hydrogen stream is flowed through the purifier at a flow rate from about 0.2 kg/hr. to about 10 kg/hr.

24. A process for purifying hydrogen, the process comprising flowing a hydrogen stream comprising hydrogen and at least one contaminant from a high-pressure tank through a purifier comprising a metal organic framework adsorbent at purification conditions, thereby substantially removing said at least one contaminant, wherein the MOF is selected from MOF-74-Co, MOF-74-Ni, MOF-74-Cu, PCN-250, HKUST-1, UiO-66, UiO-66-NH$_2$, SIFSIX-3, MIL-88, MIL-89, Ga-soc-MOF, Zn$_2$(BDC)$_2$(DABCO), and mixtures thereof.

* * * * *